United States Patent
Thomassin et al.

(10) Patent No.: US 12,319,400 B2
(45) Date of Patent: Jun. 3, 2025

(54) AIRCRAFT PROPULSION SYSTEM AND METHODS OF FEATHERING

(71) Applicant: Pratt & Whitney Canada Corp., Longueuil (CA)

(72) Inventors: Jean Thomassin, Ste Julie (CA); Pierre Bertrand, Sherrington (CA); Todd A. Spierling, Rockford, IL (US); Chad M. Henze, Granby, CT (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 322 days.

(21) Appl. No.: 17/110,792

(22) Filed: Dec. 3, 2020

(65) Prior Publication Data

US 2021/0300574 A1   Sep. 30, 2021

Related U.S. Application Data

(60) Provisional application No. 62/942,969, filed on Dec. 3, 2019.

(51) Int. Cl.
| | |
|---|---|
| *B64D 27/02* | (2006.01) |
| *B64C 11/00* | (2006.01) |
| *B64D 27/24* | (2006.01) |

(52) U.S. Cl.
CPC ............ *B64C 11/002* (2013.01); *B64D 27/24* (2013.01); *B64D 27/026* (2024.01)

(58) Field of Classification Search
CPC ... B64D 2027/026; B64D 27/02; B64D 35/08
See application file for complete search history.

(56) References Cited

U.S. PATENT DOCUMENTS

| | | | |
|---|---|---|---|
| 10,145,291 | B1 | 12/2018 | Thomassin et al. |
| 2008/0184906 | A1* | 8/2008 | Kejha ............... B64U 50/19 102/374 |
| 2013/0094963 | A1* | 4/2013 | Rolt ............... B64D 27/02 416/31 |
| 2016/0236790 | A1* | 8/2016 | Knapp ............... B64C 11/44 |
| 2016/0355272 | A1* | 12/2016 | Moxon ............... B64D 35/04 |
| 2017/0320584 | A1* | 11/2017 | Menheere ............... F02C 3/145 |
| 2020/0017228 | A1* | 1/2020 | Combs ............... B64D 27/02 |

(Continued)

FOREIGN PATENT DOCUMENTS

EP    3335995 A1 *   6/2018   ............. B63H 21/20

OTHER PUBLICATIONS

Extended European Search Report date Jul. 1, 2022, issued during the prosecution of European Patent Application No. EP22158348.7.

(Continued)

*Primary Examiner* — Timothy D Collins
*Assistant Examiner* — Justin Michael Heston
(74) *Attorney, Agent, or Firm* — NORTON ROSE FULBRIGHT CANADA LLP

(57) ABSTRACT

An aircraft propulsion system including at least first airmover, an electric motor configured to at least partially power the at least first airmover, wherein the first airmover includes a propeller having at least a first position configured to provide thrust to the aircraft and a second position configured to recharge a power source, wherein the second position is a reverse windmilling position, and a heat engine configured to at least partially power the first air mover or a second air mover.

13 Claims, 5 Drawing Sheets

(56) References Cited

U.S. PATENT DOCUMENTS

2020/0149427 A1* 5/2020 Long .................. B64D 27/02
2021/0114740 A1* 4/2021 Berkey ................ B64C 11/06
2021/0403169 A1* 12/2021 Tantot ................. B60L 50/13

OTHER PUBLICATIONS

Extended European Search Report for European Patent Application No. EP22158347.9, dated Jun. 30, 2022.
Extended European search report issued in corresponding EP application No. 20211638.0, dated Apr. 28, 2021.

* cited by examiner

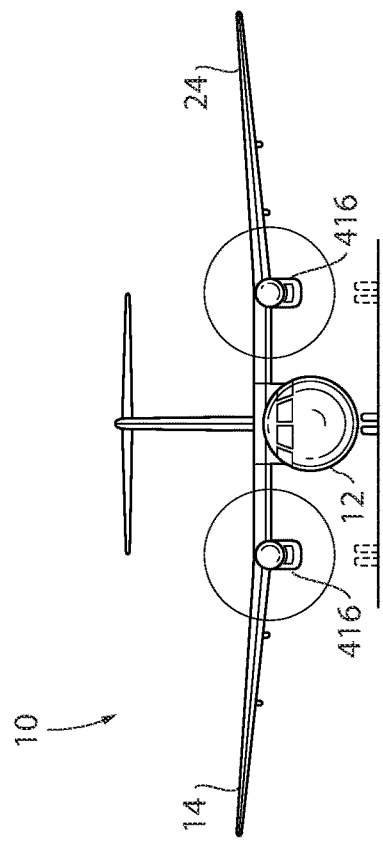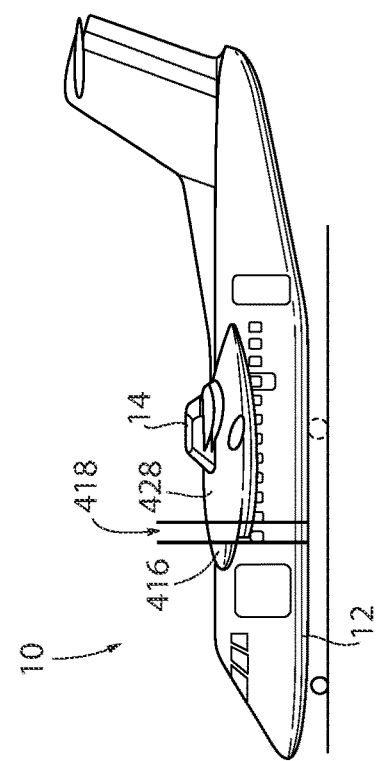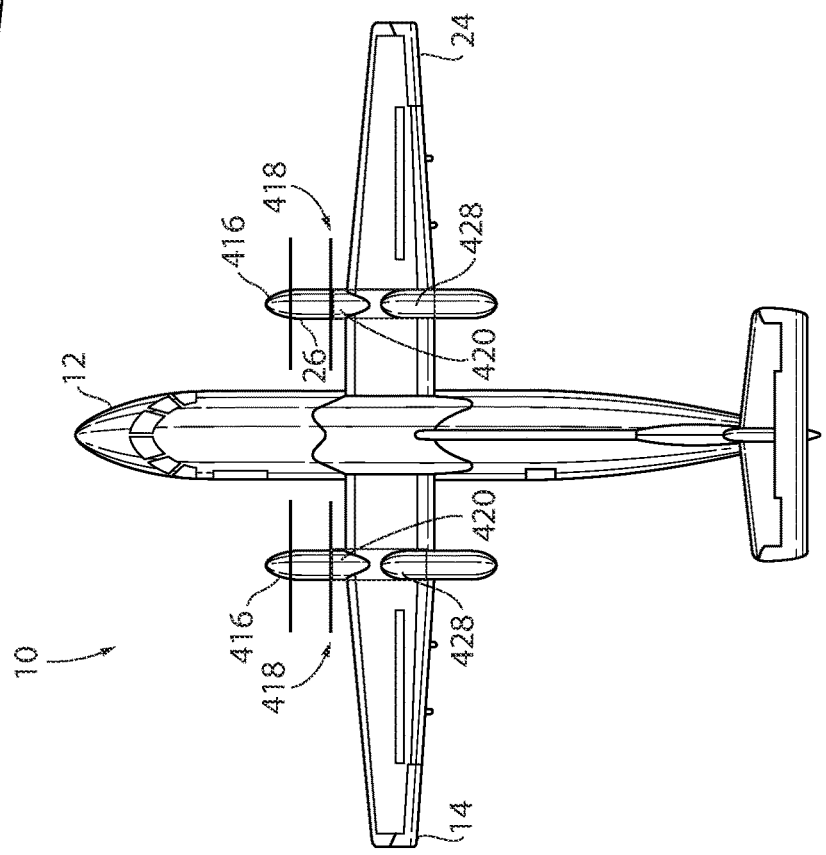

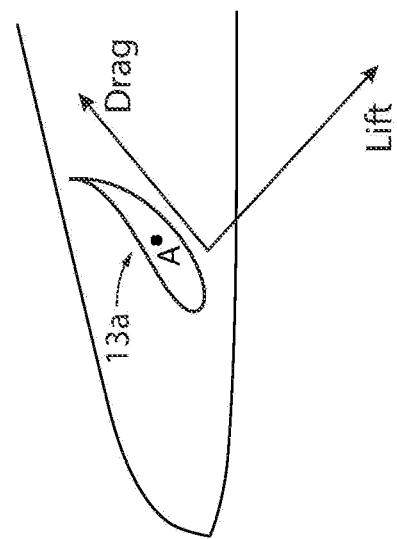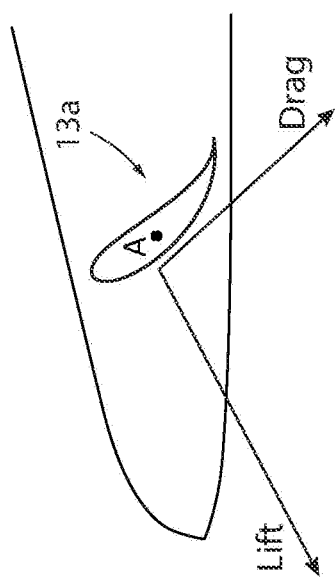
Fig. 13

AIRCRAFT PROPULSION SYSTEM AND METHODS OF FEATHERING

CROSS-REFERENCE TO RELATED APPLICATIONS

This application claims priority to and the benefit of U.S. Provisional Application No. 62/942,969, filed Dec. 3, 2019, the entire contents of which are herein incorporated by reference in their entirety.

BACKGROUND OF THE INVENTION

1. Field of the Invention

The subject invention is directed to an aircraft propulsion system having and more particularly, to a commercial passenger aircraft having a propulsion system that includes hybrid-electric powerplants.

2. Description of Related Art

The level of air traffic continues to increase worldwide, leading to increased fuel consumption and air pollution. Consequently, efforts are underway to make aircraft more environmentally compatible through the use of specific types of fuel and/or by reducing fuel consumption through the use of more efficient drive systems.

For example, aircraft having mixed drive systems that include a combination of various types of engines are known for reducing pollutants and increasing efficiency. Some current combinations include reciprocating engines and jet engines, reciprocating engines and rocket engines, jet engines and rocket engines, or turbojet engines and ramjet engines.

While these mixed drive systems are useful, they are not readily adaptable for use on commercial passenger aircraft. However, hybrid-electric propulsion systems that provide power through a combustion engine and an electric motor are indeed adaptable for use with commercial passenger aircraft and can provide efficiency benefits including reduced fuel consumption. The subject invention is directed to an aircraft having such a propulsion system.

SUMMARY OF THE DISCLOSURE

The subject disclosure is directed to a new and useful aircraft, aircraft propulsion system, and method of use of the system having a hybrid-electric powerplant, and a mode of recharging the system.

An aircraft and aircraft propulsion system includes at least a first airmover, an electric motor configured to at least partially power the at least first airmover, wherein the first airmover includes a propeller having at least a first position configured to provide thrust to the aircraft and a second position configured to recharge a power source connected to the electric motor, wherein the second position is a reverse windmilling position of the airmover, and a heat engine configured to at least partially power the first air mover or a second air mover.

The heat engine and the electric motor can be arranged in an in-line drive configuration. The heat engine and the electric motor can be configured to drive a single combined gearbox. The heat engine and the electric motor can be configured to drive separate airmovers. The heat engine and the electric motor are configured to power the first air mover separately and in combination, the heat engine and the electric motor can be configured to drive the airmover by a concentric shaft. The heat engine and the electric motor can be connected to separate respective and dedicated gearboxes.

The aircraft propulsion system of can also include a second air mover, a third air mover, a fourth air mover, wherein at least one of the airmovers can be powered exclusively by the electric motor and at least one airmovers can be powered exclusively by the heat engine. Other configurations including more props and more airmovers is also envisioned. In this configuration, each of the airmovers powered exclusively by an electric motor can be positioned outboard of the airmovers powered by a heat engine or each of the airmovers powered exclusively by an electric motor can be positioned inboard of the airmovers powered by a heat engine. At least one of the air movers can be a pusher and at least one of the air movers can be a tractors. The heat engine can be configured to power a first dedicated propeller and the electric motor can be configured to power a second dedicated propeller.

A method of operating the aircraft propulsion system is also disclosed. The method includes reverse windmilling an airmover connected to electric motor and recharging a power supply while reverse windmilling the airmover. The method can further include providing thrust to the aircraft by the airmover connected to the electric motor. The method can further include switching from providing thrust to the aircraft to reverse windmilling of the airmover and vice versa. Switching to windmilling can include rotating at least one blade of the airmover by at least 90 degrees with respect to an operating position.

These and other features of the aircraft propulsion system of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those having ordinary skill in the art will readily understand how to make and use the subject invention without undue experimentation, preferred embodiments thereof will be described in detail herein below with reference to the figures wherein:

FIG. 10 is a top plan view of a commercial passenger aircraft having a propulsion system configured in accordance with an embodiment of the subject invention, which includes a combustion powerplant and a hybrid-electric powerplant arranged in a coaxial configuration;

FIG. 11 is a front elevational view of the aircraft illustrated in FIG. 10;

FIG. 12 is a left side front elevational view of the aircraft illustrated in FIG. 10; and FIG. 13 is a series of wind milling positions of the rotors of FIGS. 1-12.

DETAILED DESCRIPTION OF THE PREFERRED EMBODIMENTS

Figure 3:
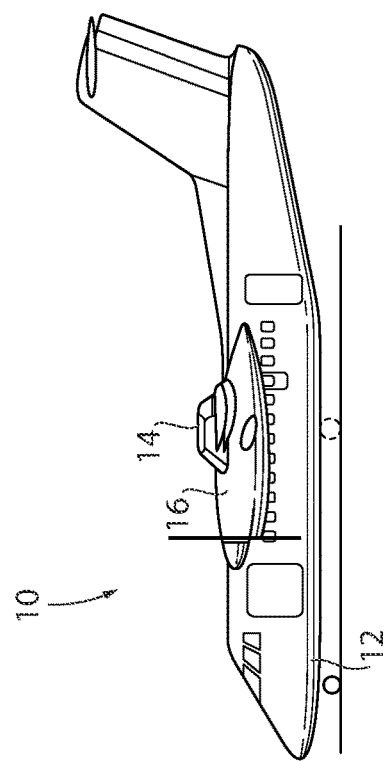
FIG. 3 is a left side front elevational view of the aircraft illustrated in FIG. 1.
Figure 2:
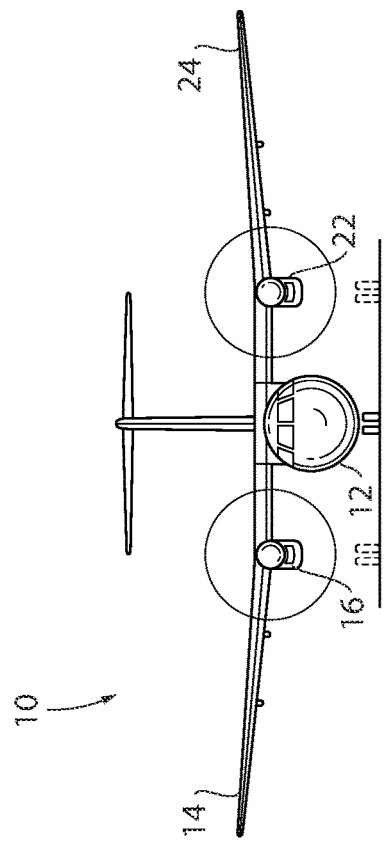
FIG. 2 is a front elevational view of the aircraft illustrated in FIG. 1.

Referring now to the drawings wherein like reference numeral identify similar structure or features of the subject invention, there is illustrated in FIGS. 1 through 13 a commercial passenger aircraft 10 having a propulsion system that is configured in accordance with a preferred embodiment of the subject invention.

The aircraft 10 includes a fuselage 12 designed to carry passengers, a left wing 14 and a right wing 24. Each wing 14/24 includes an airmover 16. An electric motor 20 is configured to at least partially power the airmover 16. The airmover 16 includes a propeller 22 having at least a first position configured to provide thrust to the aircraft 10 and a second position configured to recharge a power source 26 connected to the electric motor 20. The second position is a reverse windmilling position. A heat engine 28 is included to at least partially power the airmover 16.

It is envisioned that the electric motor 20 would be designed to output up to 1 MW or more of shaft power to propeller 22, with an output shaft speed of 12,000 RPM, or at any speed for the best combination of power density, heat management and efficiency, however other system providing are also envisioned.

It is also envisioned that the power source 26 (a battery system) would provide energy to the electric motor 20. The battery system could be located within the fuselage 12 of the aircraft 10 and/or within the wings 14, 24 of the aircraft 10, or in any other optimum location for space availability and proximity of use.

It is further envisioned that the heat engine 28 could be a heat engine of any type, e.g., a gas turbine, spark ignited, diesel, rotary or reciprocating engine of any fuel type with a configuration of turbomachinery elements, selected from a group consisting of a turbocharger, turbo-supercharger, or supercharger and exhaust recovery turbo compounding, which is mechanically, electrically, hydraulically or pneumatically driven. An example of a rotary engine suitable for this application is disclosed in U.S. Pat. No. 10,145,291, the disclosure of which is herein incorporated by reference in its entirety.

Figure 1:
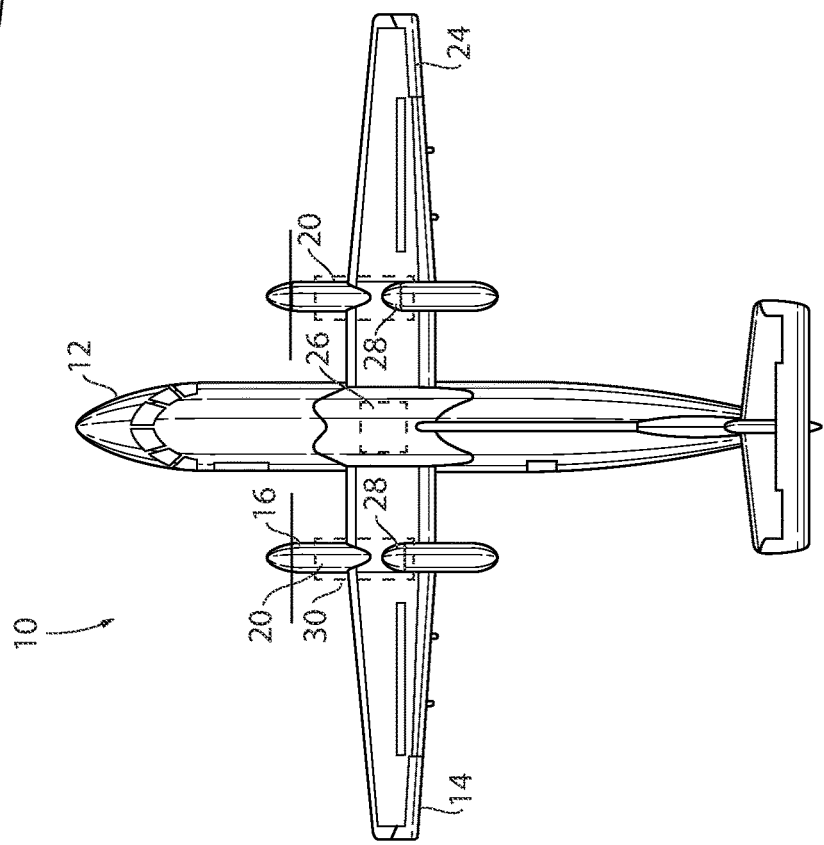
FIG. 1 is a top plan view of a commercial passenger aircraft having a propulsion system configured in accordance with an embodiment of the subject invention, which includes a combustion powerplant and a hybrid-electric powerplant within the same air mover.

Further shown in FIG. 1, the heat engine 28 and the electric motor 20 can be arranged in an in-line drive configuration. The heat engine and the electric motor can be configured to drive a single combined gearbox 30.

Figure 5:
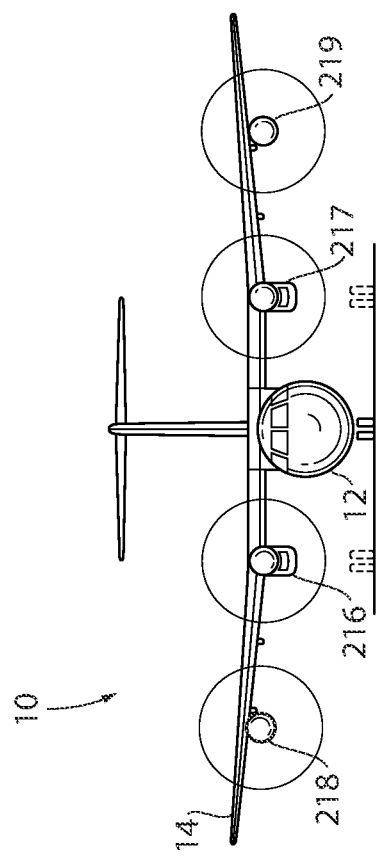
FIG. 5 is a front elevational view of the aircraft illustrated in FIG. 4.
Figure 6:
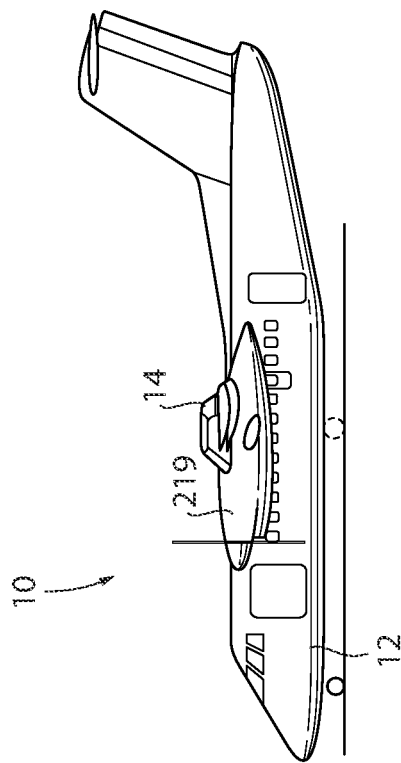
FIG. 6 is a left side front elevational view of the aircraft illustrated in FIG. 4.
Figure 4:
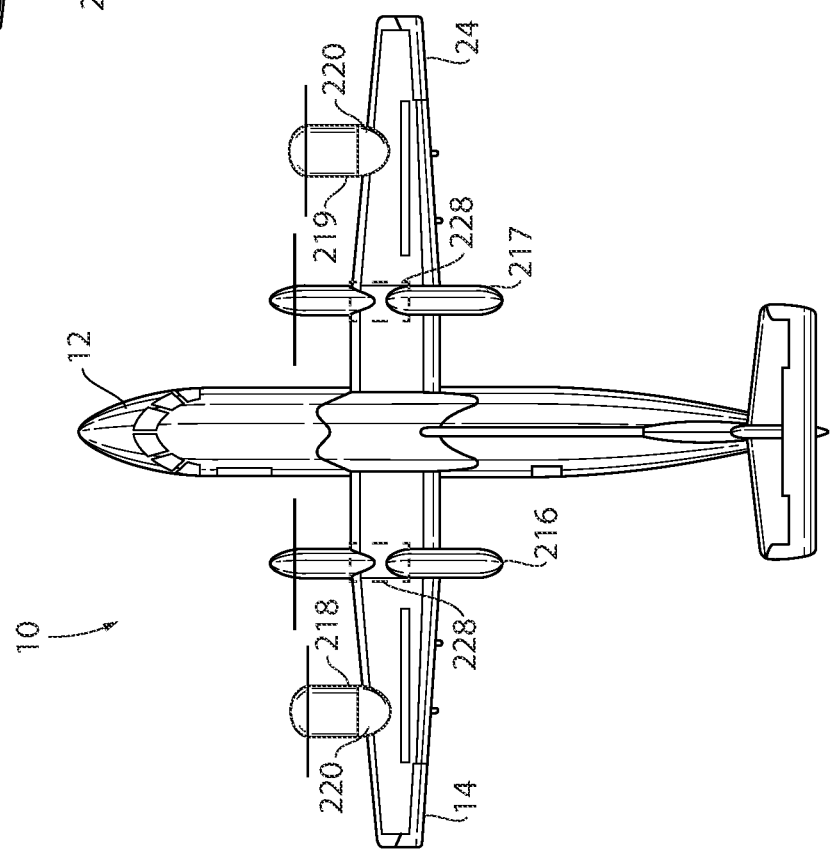
FIG. 4 is a top plan view of a commercial passenger aircraft having a propulsion system configured in accordance with an embodiment of the subject invention, which includes a combustion powerplant and a hybrid-electric powerplant each dedicated to individual air movers.

As show in FIGS. 4-6 the aircraft can also include a second air mover 217, a third 218 air mover, and a fourth air mover 219. At least one of the airmovers 216-219 can be powered exclusively by an electric motor 220 and at least one airmovers can be powered exclusively by the heat engine 228. Each of the airmovers 218/219 powered exclusively by an electric motor 220 can be positioned outboard of the airmovers 216/217 powered by a heat engine 228. Alternatively it is conceived that the airmovers powered exclusively by an electric motor can be positioned inboard of the airmovers powered by a heat engine.

Figure 8:
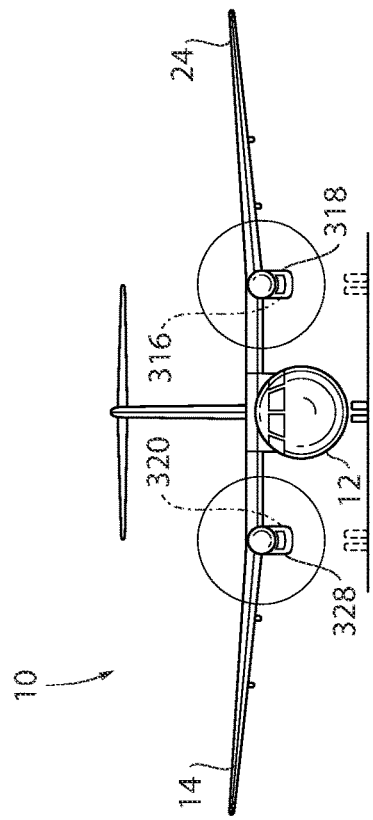
FIG. 8 is a front elevational view of the aircraft illustrated in FIG. 7.
Figure 9:
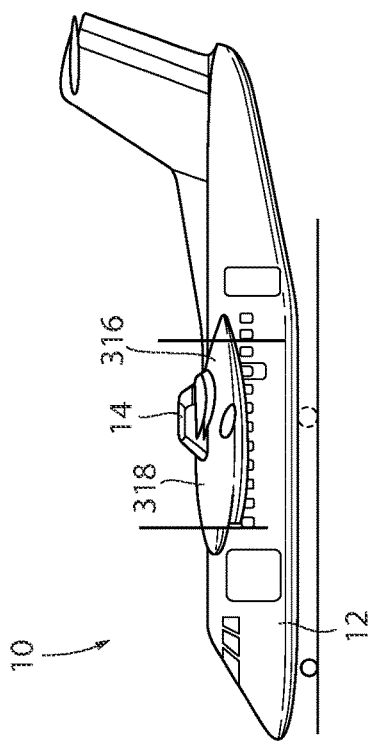
FIG. 9 is a left side front elevational view of the aircraft illustrated in FIG. 7.
Figure 7:
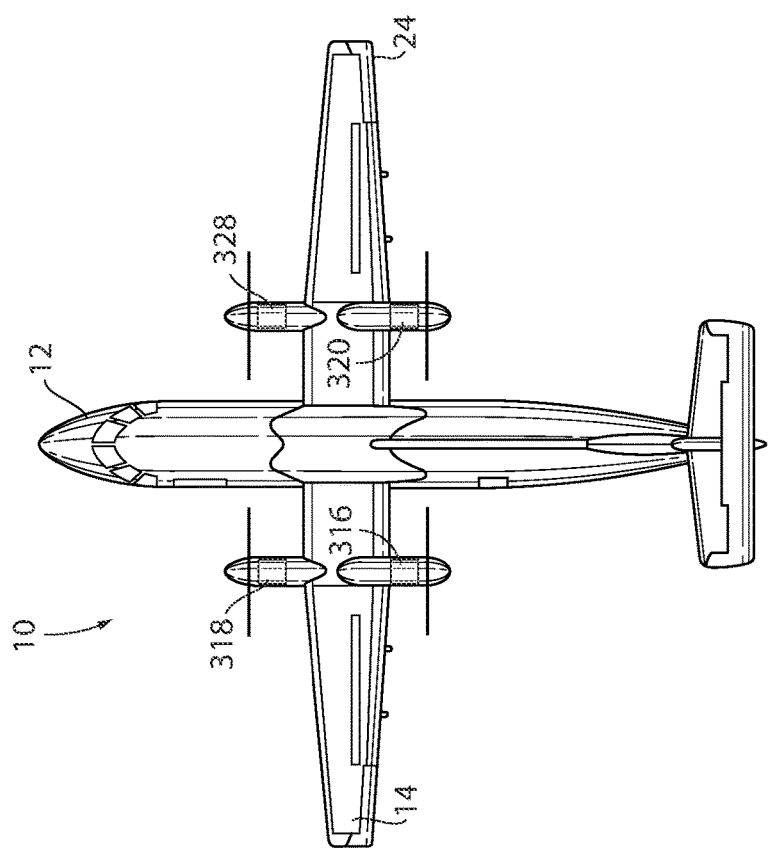
FIG. 7 is a top plan view of a commercial passenger aircraft having a propulsion system configured in accordance with an embodiment of the subject invention, which includes a combustion powerplant and a hybrid-electric powerplant arranged as a pusher and a tractor configuration.

As shown in FIGS. 7-9 at least one of the air movers 316/318 can be a pusher and at least one of the air movers can be a tractors. The heat engine 328 can be configured to power a first dedicated propeller 318 and the electric motor 320 can be configured to power a second dedicated propeller 316. The configuration show shows the air movers 316/318 set up in line.

As shown in FIG. 10-12, each heat engine 428 can be configured to power a first dedicated propeller 418 of each wing and each electric motor 420 can be configured to power a second dedicated propeller 416 of each wing. The propellers 418/416 are in line and can share a common shaft. This configuration allows an aft air mover to straighten flow, improving the efficiency of the system A method of operating the aircraft propulsion system is also disclosed. The method includes reverse windmilling an airmover connected to electric motor and recharging a power supply while reverse windmilling the airmover. The method can further include providing thrust to the aircraft by the airmover connected to the electric motor. The method can further include switching from providing thrust to the aircraft to reverse windmilling of the airmover and vice versa. Switching to windmilling can include rotating at least one blade 13a of the airmover by at least 90 degrees about a blade axis A, the blade axis A being a span-wide axis extending through an airfoil of the at least one blade 13a, with respect to an operating position as shown in in FIG. 13.

Any of the propulsion systems can be the result of a modification to an existing aircraft propulsion system having dual combustion power plants or be assembled as an initial configuration. Thus, the disclosure is also directed to a method of retrofitting an aircraft having a propulsion system with dual combustion powerplants.

While the systems and methods of the subject invention has been described with reference to preferred embodiments, those skilled in the art will readily appreciate that changes and/or modifications may be made thereto without departing from the spirit or scope of the subject disclosure.

What is claimed is:

1. An aircraft propulsion system comprising:
a first airmover and a second airmover disposed coaxially;
an electric motor configured to power the first airmover, wherein the first airmover includes a propeller having at least a first position configured to provide thrust to the aircraft and a second position configured to recharge a power source, wherein the second position is a reverse windmilling position in which at least one blade of the propeller is rotated about a blade axis by at least 90 degrees with respect to an operating position, the operating position corresponding to the first position configured to provide forward thrust to the aircraft, wherein the blade axis is a span-wide axis extending through an airfoil of the at least one blade; and
a heat engine configured to directly power the second air mover.

2. The aircraft propulsion system of claim 1 further comprising:
a third air mover; and
a fourth air mover;

wherein at least one of the airmovers is powered exclusively by the electric motor and at least one airmovers is powered exclusively by the heat engine.

3. An aircraft having a propulsion system according to claim 2.

4. The aircraft propulsion system as recited in claim 1, wherein the heat engine and the electric motor are configured to power the first air mover separately and in combination.

5. The aircraft propulsion system as recited in claim 4, wherein the heat engine and the electric motor are configured to drive the airmover by a concentric shaft.

6. The aircraft propulsion system as recited in claim 1, wherein the heat engine and the electric motor are arranged in an in-line drive configuration.

7. The aircraft propulsion system as recited in claim 1, wherein the heat engine and the electric motor are connected to separate respective and dedicated gearboxes.

8. The aircraft propulsion system of claim 1, wherein the heat engine is configured to power a first dedicated propeller and the electric motor is configured to power a second dedicated propeller.

9. An aircraft having a propulsion system according to claim 1.

10. A method of operating an aircraft propulsion system comprising:
reverse windmilling an airmover connected to electric motor, including rotating at least one blade of the airmover about a blade axis by at least 90 degrees with respect to an operating position, the operating position corresponding to the first position configured to provide forward thrust to the aircraft, wherein the blade axis is a span-wide axis extending through an airfoil of the at least one blade;
recharging a power supply while reverse windmilling the airmover; and
directly powering an additional airmover by a heat engine, the airmover and the additional airmover disposed coaxially.

11. The method of claim 10, further comprising providing thrust to the aircraft by the airmover connected to the electric motor.

12. The method of claim 11, further comprising switching from providing thrust to the aircraft to reverse windmilling of the airmover.

13. The method of claim 11, further comprising switching from reverse windmilling to providing thrust to the aircraft by the first airmover.

* * * * *